(No Model.)
S. SILSBEE.
METHOD OF TREATING DISEASES ELECTRICALLY.
No. 506,449. Patented Oct. 10, 1893.
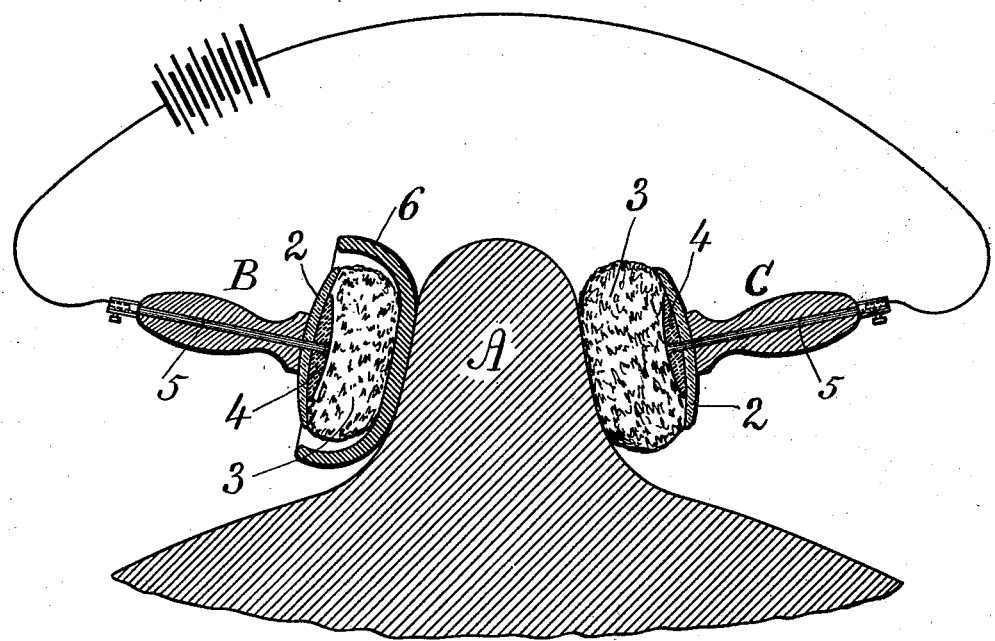
Witnesses:
J. Stait
Geo. T. Pinckney
Inventor:
Samuel Silsbee
per Lemuel W. Serrell Atty

UNITED STATES PATENT OFFICE.

SAMUEL SILSBEE, OF NEW UTRECHT, ASSIGNOR TO HIMSELF, AND ANDREW P. VAN TUYL, JR., OF BROOKLYN, NEW YORK.

METHOD OF TREATING DISEASES ELECTRICALLY.

SPECIFICATION forming part of Letters Patent No. 506,449, dated October 10, 1893.

Application filed June 30, 1893. Serial No. 479,300. (No model.)

*To all whom it may concern:*

Be it known that I, SAMUEL SILSBEE, a citizen of the United States, residing at the town of New Utrecht, in the county of Kings and State of New York, have invented an Improvement in Methods of Treating Diseases, of which the following is a specification.

Before my invention an electric current had been passed through the body and used in various ways for the treatment of different diseases. In cases where efforts have been made to combine with medicinal substances ozone, the ozone is liable to pass away or be disseminated and not to remain with the other substances. In my present improvement I apply directly to the tissues of the human body ozonized medicinal substances by means of an electric current for obtaining the transmission and absorption of therapeutic agents in the presence of ozone and the transfusion of the same through the capillary tubes of the tissues, so that they act directly upon the organs diseased and upon the adjacent nerves, allaying inflammation and upon the circulatory system, relieving congestion and ozonizing the deleterious matters and promoting their discharge from the system as effete matter.

In carrying out my improvement any ordinary medical battery is made use of and at the extremity of each cord or conductor it is preferable to attach a cup of rubber, wood or other non-conducting material for receiving a sponge or other porous substance for holding the liquids, and at the bottom of each cup is placed a disk or plate of carbon that is united with the conductor. I find that the carbon is not injured by the presence of ozone and the oxidation of the conductor or electrode is prevented.

It is advantageous to provide each of the conductors with similar cups and sponges or other porous material, and the sponge or porous material at the positive pole is saturated with an ozonized liquid, such for instance as peroxide of hydrogen or other suitable material having an excess of ozone, and a second sponge or piece of felt saturated with the medicated or therapeutic material is placed between the ozonized sponge and the body at the moment of application, the other pole of the battery being applied in any suitable manner at the other side of the portion of the body, such for instance as a tumor or organ, so that the electric current passes through such portion of the body and in so doing the action of the medicine upon the body is intensified and promoted by the presence of the ozone, the electric current passing through the ozone and through the medicated solution into the body carries the ozone and the medicated material into the body, promoting the rapid absorption and intensifying the action of the therapeutic agents and at the same time securing the vitalizing and purifying influence of the ozone and the tonic effects of the electricity, and there is no opportunity for the ozone to be dissipated or its beneficial effects lost upon the patient.

In the drawing I have illustrated the present improvements by sections of the electrodes.

A. represents part of the body; B. the positive electrode, and C. the negative electrode.

2. 2. are the cups; 3. the sponges; 4. the carbon plates within the cups to which the conductors 5. are connected, and 6. the piece of felt or other porous substance saturated with the medicated or therapeutic material.

The sponge or felt at the negative pole may be saturated with water or with some test fluid to determine the action of the medicine. Any liquid that will absorb and retain ozone may be employed as the vehicle for carrying such ozone into the tissues of the body, hence I do not limit myself in this particular, and any suitable character of medical, voltaic or galvanic battery may be used, with or without a primary and secondary coil.

I claim as my invention—

1. The method herein specified of treating the tissues of the human body, consisting in applying medical substances in suspension directly to the surface of the body, an electric circuit and an ozonized compound between the electrodes of the circuit and the therapeutic agent, for carrying into the body said material in the presence of the ozone, substantially as set forth.

2. The combination with an electric circuit and carbon electrode, of a sponge or other porous material holding an ozonized compound and a porous material holding therapeutic material upon the surface of the body, whereby the electric current carries the medical substances into the body in the presence of ozone and causes the transfusion of the same through the capillary tubes of the tissues so as to act directly upon the diseased organs, substantially as set forth.

Signed by me this 24th day of June, 1893.

SAMUEL SILSBEE.

Witnesses:
CHARLES BELLOWS,
RICHARD B. FITHIAN.